US009666916B2

United States Patent
Mizuno et al.

(10) Patent No.: US 9,666,916 B2
(45) Date of Patent: May 30, 2017

(54) BIPHASE ELECTROLYTE FOR A METAL-AIR BATTERY

(71) Applicant: Toyota Motor Engineering & Manufacturing North America, Inc., Erlanger, KY (US)

(72) Inventors: Fuminori Mizuno, Ann Arbor, MI (US); Kensuke Takechi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 87 days.

(21) Appl. No.: 14/533,286

(22) Filed: Nov. 5, 2014

(65) Prior Publication Data
US 2016/0126605 A1 May 5, 2016

(51) Int. Cl.
*H01M 12/02* (2006.01)
*H01M 12/08* (2006.01)

(52) U.S. Cl.
CPC ........... *H01M 12/02* (2013.01); *H01M 12/08* (2013.01); *H01M 2220/20* (2013.01); *H01M 2300/0002* (2013.01); *H01M 2300/0045* (2013.01); *Y02E 60/128* (2013.01)

(58) Field of Classification Search
USPC ........................................................ 429/403
See application file for complete search history.

(56) References Cited

U.S. PATENT DOCUMENTS

| 4,377,623 | A | 3/1983 | Parker et al. | |
|---|---|---|---|---|
| 6,797,437 | B2 | 9/2004 | Tsukamoto et al. | |
| 7,880,024 | B2 * | 2/2011 | Lim | C07C 53/126 554/103 |
| 8,481,207 | B2 | 7/2013 | Friesen et al. | |
| 2010/0285375 | A1 * | 11/2010 | Friesen | H01M 12/06 429/405 |
| 2011/0305959 | A1 | 12/2011 | Friesen et al. | |
| 2012/0141889 | A1 * | 6/2012 | Lee | H01M 12/06 429/405 |
| 2013/0143134 | A1 * | 6/2013 | Mizuno | H01M 4/8626 429/405 |
| 2014/0125292 | A1 | 5/2014 | Best et al. | |

OTHER PUBLICATIONS

U.S. Appl. No. 14/538,290, filed Nov. 11, 2014, Mizuno, et al.
Stefano Meini, et al. "The Effect of Water on the Discharge Capacity of a Non-Catalyzed Carbon Cathode for Li-$O_2$ Batteries" *Electrochemical and Solid-State Letters*, 15 (4) A45-A48 (2012).

(Continued)

*Primary Examiner* — Ula C Ruddock
*Assistant Examiner* — Osei Amponsah
(74) *Attorney, Agent, or Firm* — Oblon, McClelland, Maier & Neustadt, L.L.P.

(57) ABSTRACT

A metal-air battery comprising a two phase electrolyte system is provided. The two phase electrolyte system contains an aqueous phase and an ionic liquid phase wherein an amount of water exceeds the aqueous solubility of the ionic liquid. In one embodiment the metal-air battery is a lithium-air battery.

12 Claims, 2 Drawing Sheets

(56) References Cited

OTHER PUBLICATIONS

Xiao-Zi Yuan, et al. "Oxygen Reduction Reaction in 1-Butyl-1-methyl-pyrrolidinium Bis(trifluoromethanesulfonyl)imide: Addition of Water as a Proton Species", *Journal of the Electrochemical Society*, 161 (4) A451-A457 (2014).
Xu, Jun John, et al., "Novel Zinc Ion Conducting Polymer Gel Electrolytes Based on Ionic Liquids", Electrochemistry Communications (2005) 7:1309-1317.
Kuboki, Takashi, et al., "Lithium-air batteries using hydrophobic room temperature ionic liquid electrolyte", Journal of Power Sources (2005) 146:766-769.
Tao Zhang, et al. "A Novel High Energy Density Rechargeable lithium/air Battery", Received (in Cabridge, U.K) Sep. 30, 2009, Accepted Jan. 22, 2010.

* cited by examiner

BIPHASE ELECTROLYTE FOR A METAL-AIR BATTERY

BACKGROUND OF THE INVENTION

The present invention is directed to an electrolyte system for a metal-air battery having high capacity and recycle efficiency.

Lithium ion technology has dominated the market as energy source for small electronic devices and even hybrid electric vehicles. However, Li-ion batteries have insufficient theoretical capacity to be a power source for future high capacity generations of power sources capable to run an electric vehicle.

Metal-air batteries have been under investigation as advanced generation of high capacity energy sources that have the potential to power vehicular devices for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product as oxide or peroxide combines with the metal cation to form the discharge product. Upon charge, this process is ideally reversed. Metal-air batteries are recognized to have potential advantageous properties over metal ion batteries because the cathodic material, oxygen, may be obtained from the environmental air atmosphere and thus the capacity of the battery would in theory be limited by the anodic metal supply. Thus, oxygen gas would be supplied continuously from outside the battery and battery capacity and voltage would be dependent upon the oxygen reducing properties and chemical nature of the discharge product formed.

Metal-air batteries typically include a metal electrode at which a metal is oxidized, an air electrode at which oxygen is reduced, and an electrolyte for providing ion conductivity. A significant limiting factor with conventional metal-air batteries is the evaporation of the electrolyte solution (i.e., the ionically conductive medium), particularly the evaporation of the solvent, such as water in an aqueous electrolyte solution and organic solvent in a non-aqueous electrolyte solution. Because the air electrode is required to be air permeable to absorb oxygen, it also may permit the solvent vapor to escape from the cell. Over time, the cell's operation efficiency is reduced due to solvent depletion.

Other problems associated with aqueous electrolyte batteries include water electrolysis during recharging and self discharge. During recharge, a current is passed through the battery to reduce the oxidized fuel at the fuel electrode. Some of the current, however, electrolyzes the water resulting in hydrogen evolution (reduction) at the fuel electrode and oxygen evolution (oxidation) at the oxygen electrode as represented in the following equations:

$$2H_2O(l) + 2e^- \rightarrow H_2(g) + 2OH^-(aq) \quad \text{Reduction:}$$

$$2H_2O(l) \rightarrow O_2(g) + 4H^+(aq) + 4e^- \quad \text{Oxidation:}$$

In this manner, further aqueous electrolyte is lost from the battery. Additionally, the electrons that are consumed in reducing hydrogen are not available to reduce the oxide. Therefore, the parasitic electrolysis of the aqueous electrolyte reduces the long term cycle efficiency of the secondary battery.

To compensate for these problems, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ohmic resistance and detract from performance.

Metals employed as oxidizable anode materials include any metal, alloy or metal hydrides thereof. For example, the fuel may comprise transition metals, alkali metal, and alkaline earth metals. Transition metals include, but are not limited to zinc, iron, manganese, and vanadium. The most common alkali metal is lithium but other alkali metals including sodium may be used. The other metals include, but are not limited to magnesium, aluminum, calcium and gallium. The metal electrode may comprise a metal, including elemental metal, metal bonded in a molecule or complex, including oxides, metal alloys, metal hydrides, etc.

The metal electrode may have any construction or configuration and may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector.

Lithium air batteries have the potential to supply 5-10 times greater energy density than conventional lithium ion batteries and have attracted much interest and development attention as a post lithium ion battery technology. For example, a nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology in general and specifically current nonaqueous lithium air batteries suffer many technical problems which have prevented achievement of the theoretical capacity.

The capacity of the Li air battery is highly dependent upon the capacity of the cathode matrix to store the $Li_2O_2$ discharge product. $Li_2O_2$ is generally insoluble in conventional nonaqueous solvents employed in metal air batteries. Therefore, upon formation at the cathode matrix the $Li_2O_2$ precipitates and fills the surface porosity of the matrix thus preventing access to the vacant capacity of the matrix interior region. Moreover, $Li_2O_2$ is an insulator and therefore, once the surface of the matrix is coated, oxygen reduction is prevented and discharge terminated, i.e., the capacity of the battery is severely reduced in comparison to the theoretical capacity.

Furthermore, the cathode performance is strongly affected by the moisture content of ambient air. To simplify the cathode reaction mechanism, much effort has been devoted to battery systems having a supply of pure oxygen to the cathode. However, practically speaking, the structure, cost and equipment necessary for such a system detracts from the potential advantages. To be of utmost utility the metal air battery will require utility of ambient air.

In non-aqueous Li-air battery, water is detrimental to battery performance as described above. To date in spite of much experimental effort and study, no practically feasible method to develop a metal-air battery that functions efficiently with ambient air as oxygen source has been developed. One consideration may be to dry the ambient air in advance before introduction into the battery. However, in order to decrease the water content of air to an acceptable level (less than hundreds ppm), the dehydration system required would be too large. This will be also unrealistic for the installment of Li-air battery.

In view of the problems associated with non-aqueous electrolyte metal-air batteries, selecting an aqueous Li-air battery system may be considered. However, in an aqueous system, a highly concentrated alkaline solution is formed about the cathode which is corrosive to surrounding materials of construction. Also, in an aqueous system, water functions both as an electrolyte solvent and an active material. As a consequence the water content of the system is depleted during operation of the battery and requires a certain level of humidity in the environmental air supply to remain functional. However, this is not feasible for batteries operating in an environment of elevated or freezing temperatures. Thus water management is an element which is key to success of the aqueous Li-air battery.

The purpose of this invention is to develop new electrolyte solvents containing water that may have general utility for metal-air batteries and specifically for Li-air batteries. This novel electrolyte will be suitable for utility as a non-aqueous electrolyte solvent as well as aqueous electrolyte solvent.

Effort to overcome the problems listed above for metal-air batteries and to produce an efficient high capacity metal-air battery has received much attention.

Best et al. (U.S. 2014/0125292) describes lithium ion or lithium metal batteries containing electrolyte systems containing ionic liquids. A water content of less than 1000 ppm in the ionic liquid is described as allowable. However, lower levels, "less than 750 ppm, less than 500, less than 250 ppm, . . . " are described as preferred embodiments. Best does not describe a two phase aqueous/ionic liquid composition. It is believed that the water levels described in this reference are dissolved amounts and therefore a single phase electrolyte solvent is disclosed.

Friesen et al. (U.S. Pat. No. 8,481,207) describes a metal air battery containing an ionic liquid as an electrolyte component and an anode constructed of a porous material capable to absorb a liquid metal upon charging. By use of a liquid anode metal dendrite formation is avoided thus preventing shorting of the battery due to dendrite extension to the cathode. Friesen describes that the ionic liquid may contain as much as 100 ppm water. The water at 100 ppm would represent water dissolved or absorbed by the ionic liquid. Nowhere does this reference describe a two phase electrolyte system having both aqueous phase and ionic liquid phase.

Tsukamoto et al. (U.S. Pat. No. 6,797,437) describes a lithium ion secondary battery having an anode of lithium metal or porous material capable of absorbing and releasing lithium ions and a cathode of a complex oxide of lithium and a transition metal. The electrolyte is a soluble lithium salt in a two phase electrolyte system containing a carbonate and/or ether combination. The second phase is formed by a halogen containing flame retardant material. Tsukamoto does not disclose an ionic liquid as an electrolyte component and does not disclose or suggest a two phase electrolyte having aqueous and ionic liquid phases. Further, Tsukamoto does not describe a metal-air battery.

Parker et al. (U.S. Pat. No. 4,377,623) describes a zinc-halogen electrochemical cell having inert electrodes which support oxidation of zinc metal added to the cell and bromine added to the cell. The electrolyte liquid is a two phase combination of an aqueous phase containing halide ions and an organic nitrile phase containing halogen. Parker is not directed to a metal-air battery and does not disclose or suggest an ionic liquid as an electrolyte solvent.

Kuboki et al (Journal of Power Sources 146 (2005) 766-769) describes a study of hydrophobic ionic liquids for use in a lithium air battery. The equilibrium water content of several ionic liquids is determined by the amount of water absorbed from the atmosphere over an extended number of days. However, Kuboki reports that cell performance did not correlate with water absorption of the ionic liquid and also reports ionic liquids based on the imidazolium cation have small potential window of stability. Kuboki does not disclose or suggest a lithium-air battery containing a two phase electrolyte having an aqueous phase and an ionic liquid phase.

Xu et al. (Electrochemistry Communications 7 (2005) 1309-1317) describes a freestanding polymer gel electrolyte membrane for a zinc battery. The membrane is a lattice of poly(vinylidene fluoride-co-hexafluoropropylene) containing a zinc salt and a room temperature ionic liquid. Such membranes would be useful for construction of solid state batteries. Xu describes utility of the zinc ion conducting membrane in a zinc-air battery. This reference does not disclose or suggest a two phase electrolyte having an aqueous phase and an ionic liquid phase.

Friesen et al. (U.S. 2011/0305959) describes a metal-air battery having an ionic liquid based electrolyte. Metals suitable as anode materials include transition metals, alkali metals and alkali earth metals. Zinc air systems are most fully described. Friesen discusses the necessity to maintain a sufficient level of water in the electrolyte composition to drive the charge and discharge process and "tunes the ionic liquid" to contains water from 0.001 to 25% by adding a hydrophilic or hygroscopic additive which effectively absorbs water into the electrolyte. The amount of water absorbed depends on the nature and amount of the additive. Examples given for a zinc-air system include zinc chloride, zinc tetrafluoroborate zinc acetate and $Zn(TFSI)_2$. Although Friesen discloses as much as 25% water, a 2 phase ionic liquid electrolyte system is never explicitly disclosed or suggested.

Zhang et al. (Chem. Commun., 2010, 46, 1661-1663) describes a lithium air battery employing an electrolyte system composition of acetic acid/water and lithium acetate. The lithium acetate is also indicated to be formed by oxidation of the lithium metal anode. Construction of a lithium-air electrochemical cell ($Li/PEO_{18}LiTFSI/LTAP/HOAc$—$H_2O$—$LiOAc$/Pt-carbon black) is described and an energy density estimated to be 1.478 W h/kg. Zhang does not disclose or suggest an ionic liquid as an electrolyte component or a two phase (aqueous/ionic liquid) electrolyte system.

Gasteiger et al. (Electrochemical and Solid State Letters, 15 (4) A45-A48 (2012)) describes a study of the effect $CO_2$ and water on the performance of a lithium-air battery. The study showed that small amounts of water enhance capacity of the cell. Ionic liquids and/or a two phase aqueous/ionic liquid system is not disclosed or suggested.

Yuan et al. (Journal of the Electrochemical Society, 161 (4) A451-A457 (2014)) describes a study of the electrochemical performance of cells containing room temperature ionic liquids (RTIL) with as much as 1.0% water. The solubility of water in the same RTIL (1-butyl-1-methylpyrrilidinium bis (trifluoromethanesulfonyl)imide) (BMP-TFSI) was shown to be 1.1407 wt % and therefore, a two phase system is not disclosed. Additionally, Yuan does not disclose or suggest a metal-air battery with an electrolyte containing a room temperature ionic liquid (RTIL) water mixture.

In spite of the significant ongoing effort there remains a need to develop and produce an effective electrolyte system for a high capacity metal-air battery useful especially for powering vehicles to distances at least equal to or competitive with current hydrocarbon fuel systems.

SUMMARY OF THE INVENTION

This and other objects are addressed by the present invention, the first embodiment of which includes a metal-air electrochemical cell, comprising:

an anode comprising a metal, a metal alloy or a porous material capable of adsorption and release of a metal;

an air cathode; and a two phase liquid electrolyte, wherein the two phase liquid electrolyte comprises an aqueous phase and an ionic liquid phase.

In one aspect of the first embodiment the anode directly contacts only the ionic liquid phase of the electrolyte.

In other aspects of the first embodiment the metal of the anode comprises a metal selected from the group consisting of a transition metal, an alkali metal and an alkaline earth metal.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Throughout this description all ranges described include all values and sub-ranges therein, unless otherwise specified. Additionally, the indefinite article "a" or "an" carries the meaning of "one or more" unless otherwise specified.

According to the present invention the term "vehicle" means any power driven device designed for transportation including an automobile, truck van, bus, golf cart and other utility forms of transportation.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain description air of pure $O_2$ may be described as the source of the cathode ingredient.

The present inventors are conducting a broad and detailed study of post-lithium ion battery technologies seeking to identify and develop new and improved energy supply systems having capacity and voltage suited to specific uses. Metal-air batteries having high capacity and high working potential are ongoing targets of such study and in this ongoing study the inventors have discovered a new and novel two phase electrolyte system which addresses and overcomes many of the problems associated with conventionally known electrolytes employed with metal-air batteries and especially lithium-air batteries.

Figure 1:
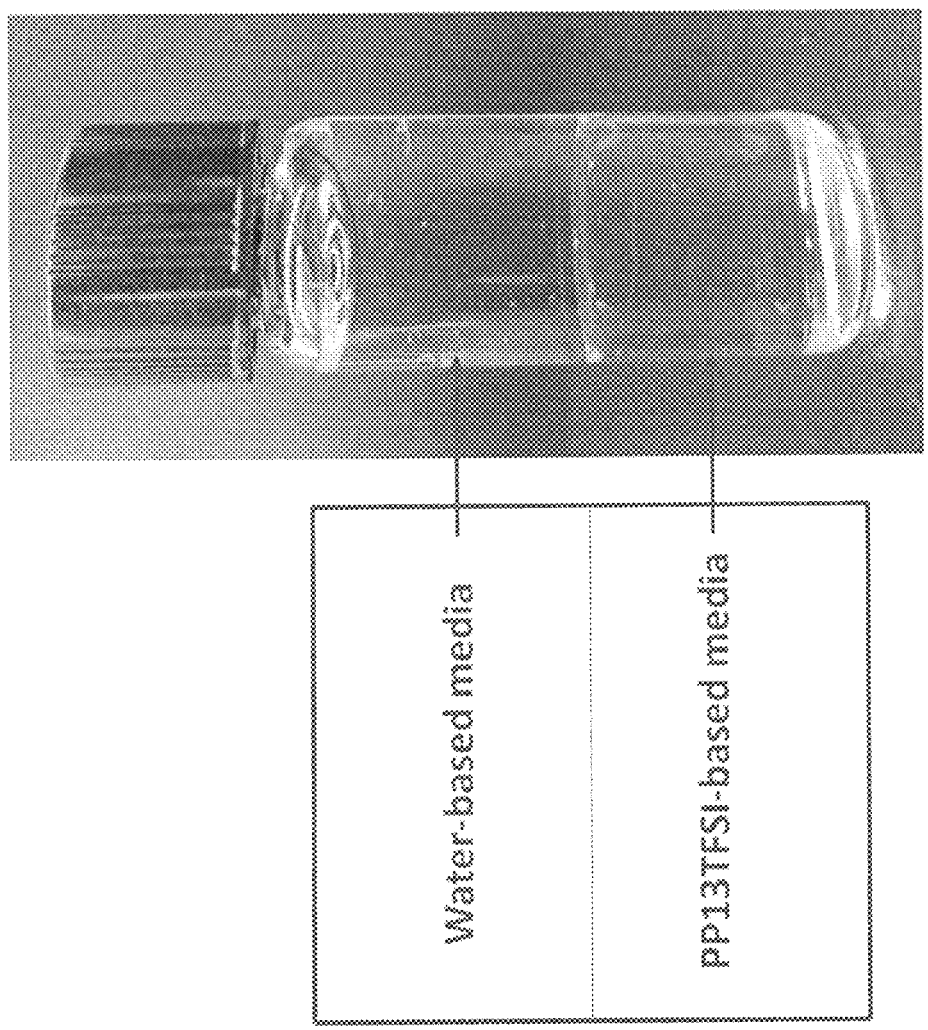
FIG. 1 shows a two phase electrolyte system according to one embodiment of the present invention.

The inventors have discovered that a two phase electrolyte system containing an aqueous phase and a room temperature ionic liquid (RTIL) provides a unique and novel mechanism to form a metal-air battery wherein water management is possible. Unlike previously reported ionic liquid systems containing dissolved moisture to the extent of water solubility of the ionic liquid, the inventors have learned that a system of an ionic liquid and water in excess of the aqueous solubility of the RTIL in the form of a two phase system such as shown in FIG. 1 is an effective electrolyte for a metal-air battery and especially for a lithium-air battery.

Thus, according to the present invention the amount of water present exceeds the aqueous solubility level of the ionic liquid such that a two phase system is formed and a volume ratio of water to ionic liquid may be from 1/20 to 20/1, preferably 1/5 to 5/1 and most preferably 1/2 to 2/1.

The ionic liquids suitable may comprise any of cations such as an imidazolium cation, a piperidinium cation, a pyrrolidinium cation, a pyridinium cation, an ammonium cation and a phosphonium cation and any of anions such as bis(trifluoromethansulfonyl)imide anion, bis(fluorosulfonyl)imide anion, tetrafluoroborate anion, hexafluorophosphate anion, dicyanamide anion and a halogen anion (chloride, bromide or iodide). In preferred embodiments the ionic liquid may have superior stability against oxygen radical species such as superoxide anion radical; for example, N-methyl-N-propylpiperidinium bis(trifluoromethansulfonyl)imide (PP13TFSI) or N,N-Diethyl-N-Methyl-N-(2-methoxyethyl)ammonium bis(trifluoromethansulfonyl)imide (DEMETFSI).

Ionic liquids may be considered as oil-like materials which are generally immiscible in water. However, ionic liquids are able to dissolve a certain volume of water and selected ionic liquids may be miscible in a water media. Such a biphase environment provides many advantages for a metal-air battery electrolyte.

For non-aqueous system, water content is controlled originally in the ionic liquid, such that the electrochemical performance is not adversely affected by the moisture content. Basically, an essentially moisture-saturated ionic liquid phase can be maintained.

The working potential of a cathode in the miscible electrolyte of the saturated ionic liquid is higher than the working potential of a cathode in a conventional non-aqueous electrolyte exposed to moisture, such as, for example, an environment at a relative humidity of 50%.

For aqueous system, water only functions as an active material and does not act as a solvent. So, the electrolyte is not dried up. Water as active material may be supplied from outside the battery with humidity control.

Also, the alkaline discharge product is retained as a solid precipitate, resulting in less corrosion and steady working potential without any significant change of pH in the solution.

The miscible electrolyte has clearly two liquid phases (biphase) of water-based and oil-based solutions which leads to a novel metal-air battery structure comprising a liquid-liquid interface. Oxygen gas may be introduced through the water-based media as the solubility of O2 gas in water is much higher than in an ionic liquid. Not only water but also O2 gas as active materials can be supplied to the water-based solution, while the electrochemical reaction is carried out in the ionic liquid phase. Even if the water is depleted, the battery will survive owing to the non-volatility of ionic liquid.

Thus, an ionic liquid with a high tolerance and stability to oxygen radicals is used and a hygroscopic ionic liquid which will absorb moisture from the incoming air is advantageous. Further, one of skill in the art will recognize that an ionic liquid that is reactive to water would not be suitable as an electrolyte component of the present invention. Additionally, the electrolyte system of the present invention allows for exposure of the cathode to air as an oxygen source because the ionic liquid is not volatile and therefore electrolyte loss during the battery operation is not a problem.

The metal of the anode may comprise any of a transition metal, an alkali metal and an alkaline earth metal. In one embodiment the anode metal is lithium or a lithium alloy.

The cathode may be of a porous unit construction and may further comprise an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $O_2$ redox reaction.

Examples of an $O_2$ redox catalyst may include but are not limited to a transition metal oxide which may include rare earth elements, for example, manganese oxides (e.g. $MnO_2$), ruthenium oxides (e.g. $RuO_2$), cobalt oxides (e.g. $Co_3O_4$), perovskites in a form of $ABO_3$ (wherein A is La, Sr, Ba etc., B is Co, Mn, Fe, Ni, etc.) and pyrochlores in a form of $A_2B_2O_7$ (wherein A is Pb, Bi etc., and B is Ru, etc.) or any combination thereof. A precious metal such as Pt, Au, Pd, Rh, Ag or any combination thereof may be present in the catalyst. Also, an organic molecule such as a phthalocyanine, polyphirin, metal organic framework, nitroxyradical, thiafulvalene or any combination thereof may be used in the catalyst. The cathode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a current collector by conventionally known methods. Any suitable current collector may be employed. Preferred current collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Supporting electrolyte salts are those salts which are conventionally known and are selected to be compatible and consistent with the anode active material. For example with a lithium anode, the lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$, $LiN(C_2F_5SO_2)_2$ and $LiC_4BO_8$.

Thus in one embodiment the present invention provides a metal-air electrochemical cell, comprising: an anode comprising a metal, a metal alloy or a porous material capable of adsorption and release of a metal; an air cathode; and a two phase liquid electrolyte sandwiched between the anode and cathode; wherein the two phase liquid electrolyte comprises an aqueous phase, an ionic liquid phase and an electrolyte salt suitable for the anode active material.

In one aspect of this embodiment the battery structure is arranged such that the anode directly contacts only the ionic liquid phase of the electrolyte. The cathode may contact either the aqueous phase or the ionic liquid phase. The electrolyte salt may be dissolved in the ionic liquid phase, the aqueous phase or in both phases. In one preferred embodiment, the electrolyte salt is dissolved in the ionic liquid phase.

In other aspects of the first embodiment the metal of the anode comprises a metal selected from the group consisting of a transition metal, an alkali metal and an alkaline earth metal.

In one special embodiment the present invention provides a lithium-air battery, comprising: an anode having lithium metal, a lithium alloy or a material capable of absorbing and releasing lithium ions; an air cathode; and sandwiched between the anode and cathode a two phase liquid electrolyte comprising an aqueous phase, an ionic liquid phase and a lithium electrolyte salt.

In an aspect of the lithium-air battery the ionic liquid may be N-methyl-N-propylpiperidinium bis(trifluoromethansulfonyl)imide (PP13TFSI) or N,N-Diethyl-N-Methyl-N-(2-methoxyethyl)ammonium bis(trifluoromethansulfonyl) imide (DEMETFSI).

In a further aspect of the lithium-air battery, the battery is arranged such that the anode only contacts the ionic liquid phase of the electrolyte. Further the lithium electrolyte salt is selected from $LiPF_6$, $LiClO_4$, $LiAsF_6$, $LiBF_4$, $LiN(CF_3SO_2)_2$, $Li(CF_3SO_3)$, $LiN(C_2F_5SO_2)_2$ and $LiC_4BO_8$.

In further embodiments the present invention provides metal-air batteries that are capable to provide sufficient energy output to be a power source for a vehicle wherein the vehicle includes an automobile, truck van, bus, golf cart and other utility forms of transportation.

In additional embodiments, the present invention includes a vehicle as defined above which contains a metal-air battery according to the invention.

Having generally described this invention, a further understanding can be obtained by reference to certain specific examples which are provided herein for purposes of illustration only and are not intended to be limiting unless otherwise specified.

EXAMPLES

Example 1

Biphase electrolyte solution prepared by N-methyl-N-propylpiperidinium bis(trifluoromethansulfonyl)imide (PP13TFSI) and distilled water with 1:1 in volume, which are exposed to ambient air with relative humidity 21%.

Comparative Example 1

Pure PP13TFSI solution exposed to ambient air with relative humidity 47% (bubbling for 30 min)
Test Condition
Technique: Cyclic voltammetry
Working electrode: Glassy carbon
Counter electrode: Pt wire
Reference electrode: Ag wire in a reference solution of 0.01 M $AgNO_3$ and 0.1 M tetrabutylammonium perchlorate (TBAP) in acetonitrile (ACN)

FIG. 1 shows an image of one of the biphase electrolyte solutions in Example 1. Top and bottom layers represent water-based and ionic liquid based media, respectively.

Figure 2:
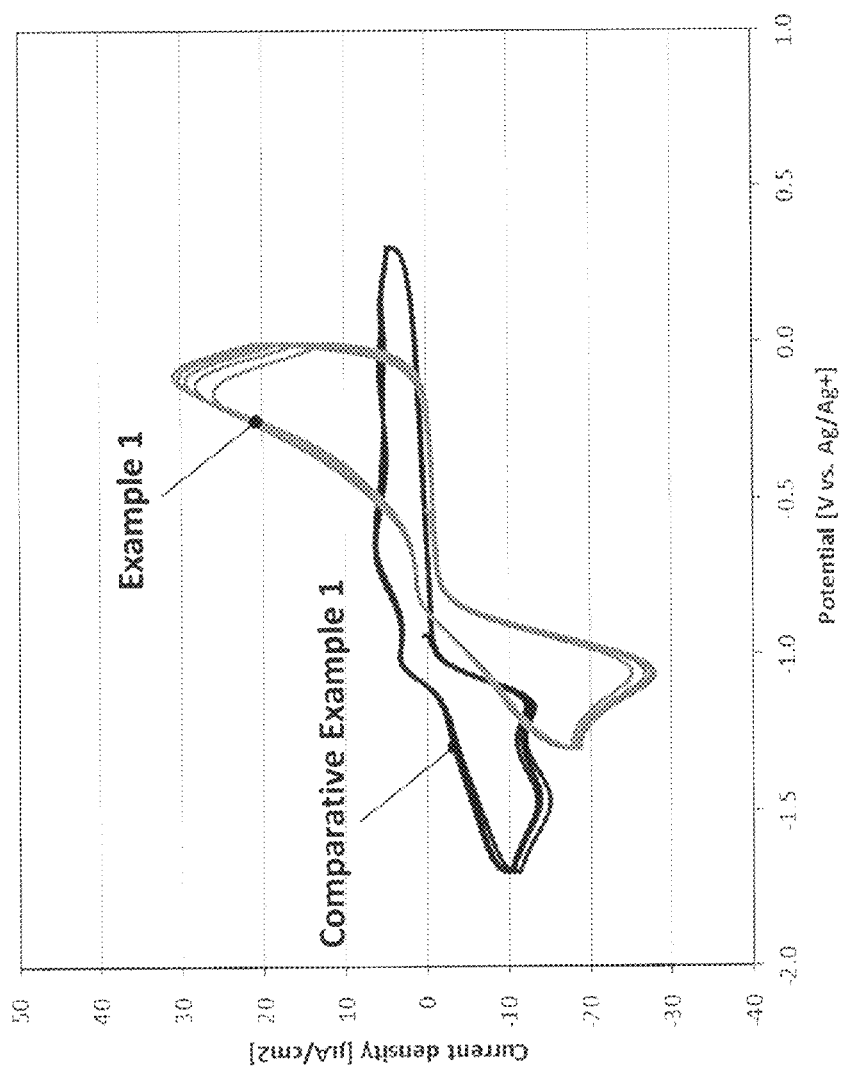
FIG. 2 shows the Discharge curves of Example 1 and Comparative example 1.

FIG. 2 shows cyclic voltammograms on the glassy carbon using the electrolytes of Example 1 and Comparative example 1. Scan rate was 50 mV/sec and the applied temperature was room temperature. All of the electrodes stayed in the ionic liquid-based media.

As shown in FIG. 2, Example 1 shows higher redox center, higher ORR potential and higher reversibility than Comparative Example 1, resulting in the higher energy density as a rechargeable battery. Also, compared with the comparative Example 1, Example 1 has the aforementioned benefits described above.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A metal-air electrochemical cell, comprising:
an anode comprising a metal, a metal alloy or a porous material capable of adsorption and release of a metal;
an air cathode; and
a two phase liquid electrolyte,
wherein the two phase liquid electrolyte comprises an aqueous phase and an ionic liquid phase,
wherein an amount of water in the two phase electrolyte system exceeds the aqueous solubility of the ionic liquid and a volume ratio of water to ionic liquid is from 1/20 to 20/1.

2. The metal-air electrochemical cell of claim 1, wherein the metal of the anode is selected from the group consisting of a transition metal, an alkali metal and an alkaline earth metal.

3. The metal-air electrochemical cell of claim 1, wherein the ionic liquid phase comprises an ionic liquid having a cation selected from the group consisting of an imidazolium cation, a piperidinium cation, a pyrrolidinium cation, a pyridinium cation, an ammonium cation and a phosphonium cation and an anion selected from the group consisting of a bis(trifluoromethansulfonyl)imide anion, a bis(fluorosulfonyl)imide anion, a tetrafluoroborate anion, a hexafluorophosphate anion, a dicyanamide anion, a chloride anion, a bromide anion and an iodide anion.

4. The metal-air electrochemical cell of claim 1, wherein the structure is arranged such that the anode directly contacts only the ionic liquid phase of the electrolyte.

5. A lithium-air battery, comprising:
an anode having lithium metal, a lithium alloy or a material capable of absorbing and releasing lithium ions;
an air cathode; and
sandwiched between the anode and cathode a two phase liquid electrolyte system comprising an aqueous phase and an ionic liquid phase,
wherein an amount of water in the two phase electrolyte system exceeds the aqueous solubility of the ionic liquid and a volume ratio of water to ionic liquid is from 1/20 to 20/1.

6. The lithium-air battery of claim 5, wherein the ionic liquid phase comprises an ionic liquid having a cation selected from the group consisting of an imidazolium cation, a piperidinium cation, a pyrrolidinium cation, a pyridinium cation, an ammonium cation and a phosphonium cation and an anion selected from the group consisting of a bis(trifluoromethansulfonyl)imide anion, a bis(fluorosulfonyl)imide anion, a tetrafluoroborate anion, a hexafluorophosphate anion, dicyanamide anion, chloride anion, bromide anion and iodide anion.

7. The lithium-air battery of claim 5, wherein the ionic liquid phase comprises N-methyl-N-propylpiperidinium bis(trifluoromethansulfonyl)imide (PP13TFSI) or N,N-Diethyl-N-Methyl-N-(2-methoxyethyl)ammonium bis(trifluoromethansulfonyl)imide (DEMETFSI).

8. The lithium air battery of claim 5, wherein the anode comprises lithium metal and the lithium metal directly contacts only the ionic liquid phase of the electrolyte.

9. The lithium air battery of claim 5, wherein the electrolyte salt comprises a salt selected from the group consisting of $LiPF_6$, $LiClO_4$, $LiAsF_6$, $LiBF_4$, $LiN(CF_3SO_2)_2$, $Li(CF_3SO_3)$, $LiN(C_2FSSO_2)_2$ and $LiC_4BO_8$.

10. The lithium-air battery of claim 5, wherein the two phase liquid electrolyte comprises N-methyl-N-propylpiperidinium bis(trifluoromethansulfonyl)imide (PP13TFSI) and distilled water.

11. A vehicle comprising the electrochemical cell of claim 1.

12. A vehicle comprising the lithium-air battery of claim 5.

* * * * *